Figure 5:
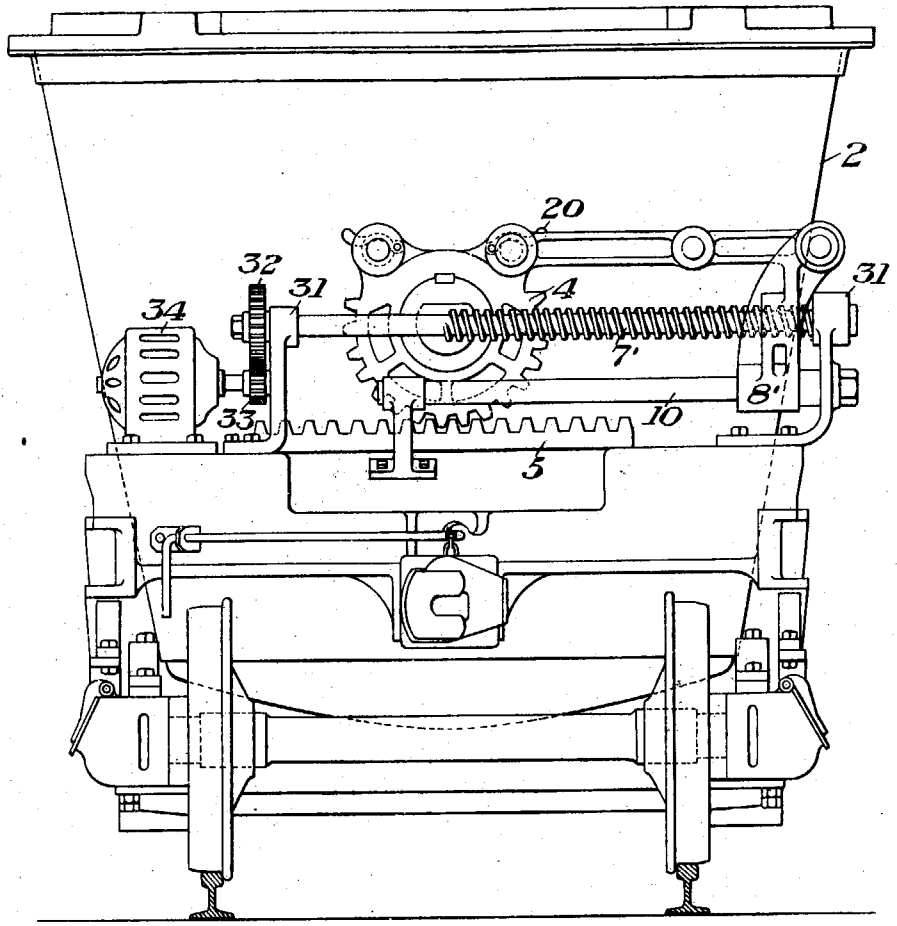

E. C. SHERMAN & W. W. McKELVEY.
DUMPING CAR.
APPLICATION FILED JAN. 15, 1909.
Reissued July 13, 1909.
12,988.
3 SHEETS—SHEET 1.
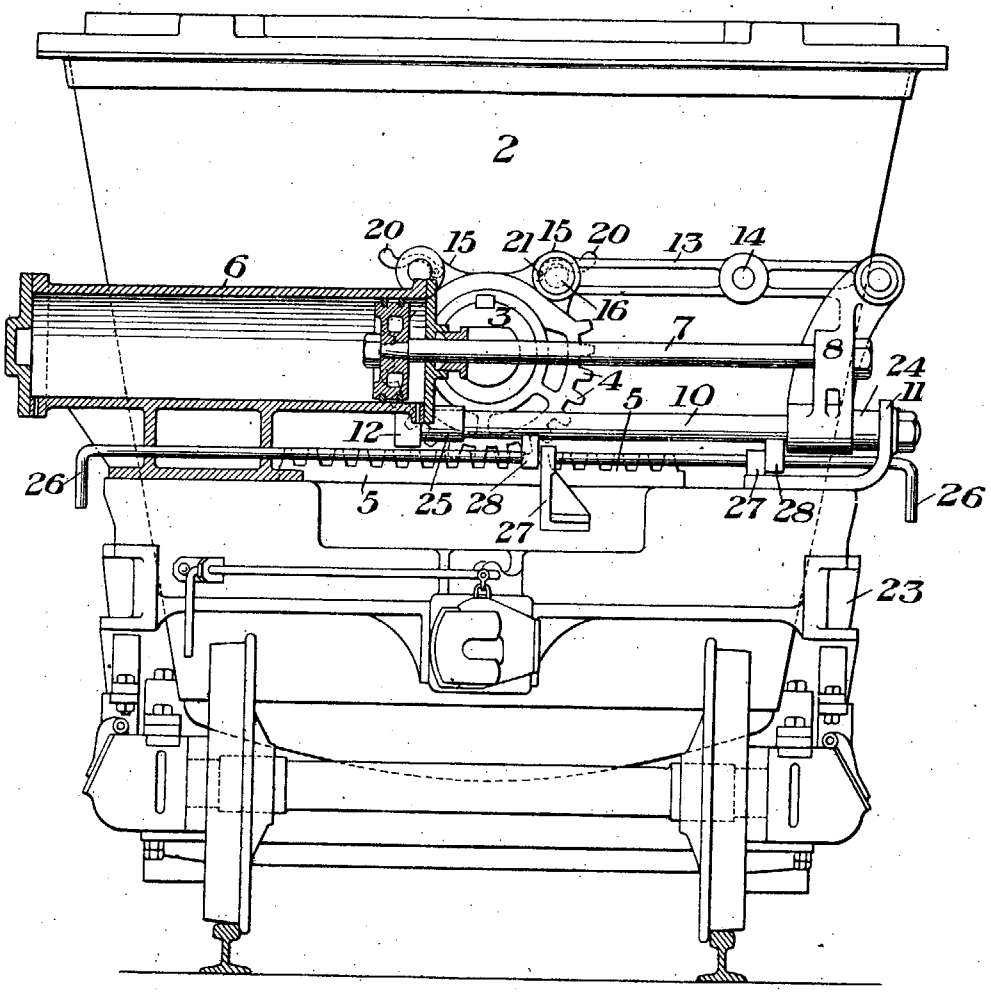
WITNESSES
R. A. Balderson
G. L. Winters
INVENTORS.
Erwin C. Sherman
William W. McKelvey
by Baldwin, Wise, & Bomsler
their attys
ANDREW. B. GRAHAM CO., PHOTO-LITHOGRAPHERS, WASHINGTON, D. C.

E. C. SHERMAN & W. W. McKELVEY.
DUMPING CAR.
APPLICATION FILED JAN. 15, 1909.
Reissued July 13, 1909.
12,988.
3 SHEETS—SHEET 2.
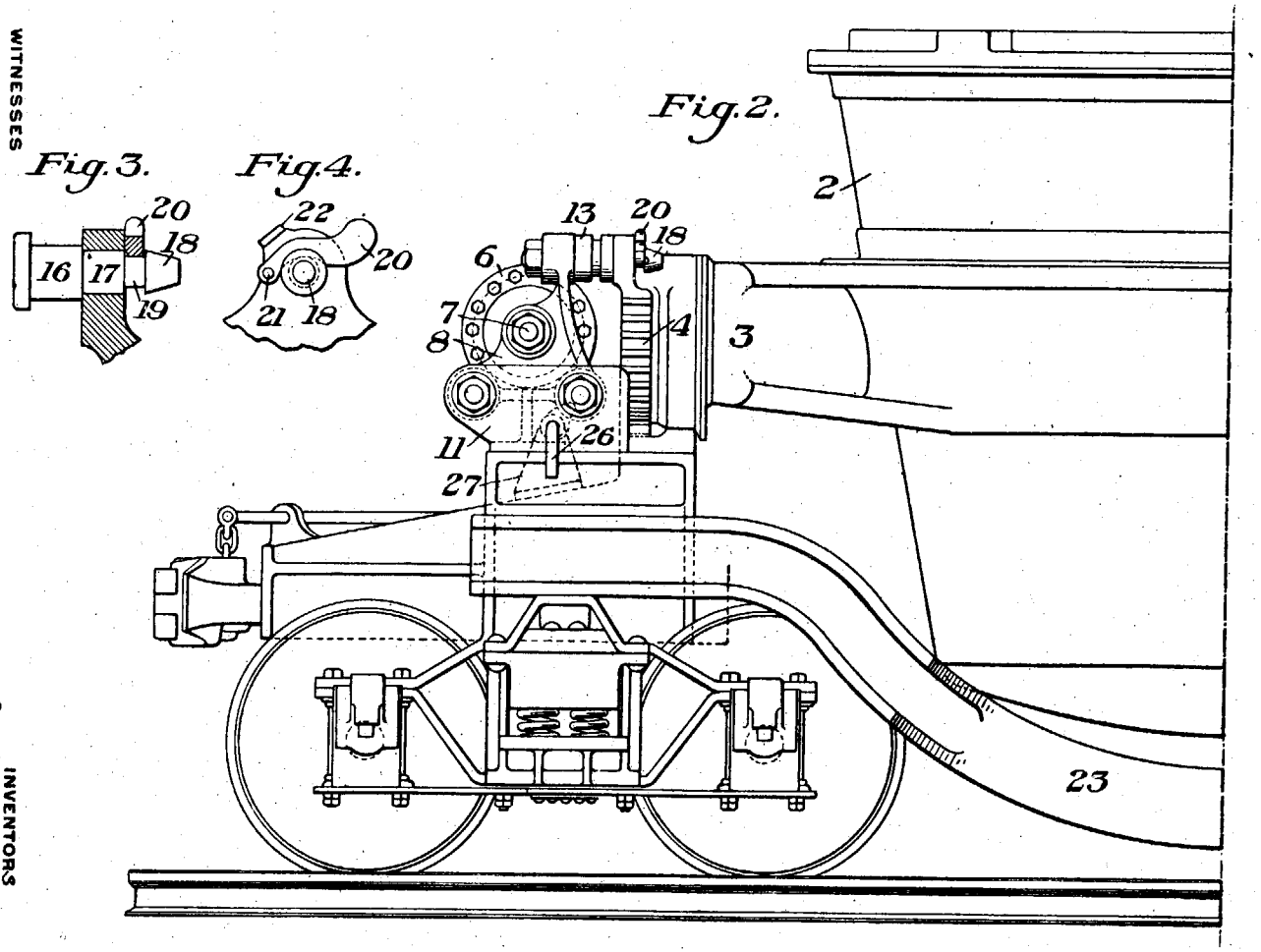
WITNESSES
R. A. Balderson
G. L. Mintere.
INVENTORS
Erwin C. Sherman
William W. McKelvey
by Baldwin, Wyman, & Crosby
their attys.
ATLANTIC W. & W. GRAHAM CO., PHOTO-LITHOGRAPHERS, WASHINGTON, D. C.

E. C. SHERMAN & W. W. McKELVEY.

DUMPING CAR.

APPLICATION FILED JAN. 15, 1909.

Reissued July 13, 1909.

12,988.

3 SHEETS—SHEET 3.

WITNESSES

R. A. Balderson

G. L. Albintere

INVENTORS

Erwin C. Sherman

William W. McKelvey

By Behnke, Byers, & Bonnelle their attys

ANDREW B. GRAHAM CO., PHOTO-LITHOGRAPHERS, WASHINGTON, D. C.

UNITED STATES PATENT OFFICE.

ERWIN C. SHERMAN AND WILLIAM W. McKELVEY, OF YOUNGSTOWN, OHIO, ASSIGNORS TO THE WILLIAM B. POLLOCK COMPANY, OF YOUNGSTOWN, OHIO, A CORPORATION OF OHIO.

DUMPING-CAR.

No. 12,988. Specification of Reissued Letters Patent. Reissued July 13, 1909.

Original No. 820,144, dated May 8, 1906, Serial No. 249,175. Application for reissue filed January 15, 1909. Serial No. 472,567.

*To all whom it may concern:*

Be it known that we, ERWIN C. SHERMAN and WILLIAM W. McKELVEY, of Youngstown, Mahoning county, Ohio, have invented a new and useful Dumping-Car, of which the following is a full, clear, and exact description, reference being had to the accompanying drawings, forming part of this specification, in which:—

Figure 1 is a sectional end elevation showing a ladle-car provided with one form of our invention. Fig. 2 is a partial side elevation of the same. Figs. 3 and 4 are detail views of the pin-retaining mechanism; and Fig. 5 is a view similar to Fig. 1, showing another form of motor and connections.

Our invention relates to dumping-cars which are tipped in either direction, more especially to ladle-cars.

The object of the invention is to provide connections by which a stationary motor may tilt the car in either direction, and, further, to provide simple and efficient means for holding the car in vertical position.

In the drawings, referring to the form of Figs. 1 and 2, 2 represents the ladle supported at its ends upon trunnions 3, to which are keyed gear-wheels 4, meshing with racks 5 upon the end frame of the car. The motor which tips the car is applied at one end only, and in this form consists of a pneumatic steam or hydraulic cylinder 6, rigidly secured to the framing. The piston-rod 7 of this double-acting cylinder is secured at its outer end to a cross-head 8, having two lower integral tubular guides 9, which slide over two guide rods 10. These guide-rods are secured at their outer ends to the stationary bracket 11, and their other ends rest in holes in stationary brackets or lugs 12. To the upper end of the cross-head 8 is pivoted a link 13, having a hole 14 in its intermediate portion and also a hole at its inner end. This link is removably secured to either of two projecting perforated lugs 15 on the upper portion of the gear-wheel 4 by the pin or bolt 16. This pin is preferably formed, as shown in Figs. 3 and 4, with a portion 17, having a slight taper and a conical head 18, with a grooved annular recess 19 in its rear. The pin is held in position by the swinging latch 20, one of which is pivoted to each lug at 21, the lug having a stop 22 to limit the lifting of the latch and the latch being normally held to lock the key by its own weight.

With the parts connected as shown in Fig. 1, when fluid is admitted to the right-hand end of the cylinder it will exert a push action through the link upon the pivotal connection to the gear-wheel, and thus tilt the ladle in a counter-clockwise direction, until the ladle-body strikes the side frame member 23, which acts as a stop. The ladle is tilted back to normal position by admitting fluid to the other end of the cylinder in the usual manner. If it is desired to tilt the ladle in a clockwise direction, the connecting-pin 16 is drawn out and fluid is admitted to the cylinder to move the link until its intermediate hole 14 registers with the hole in the lug 15. The pin 16 is then pushed in through the lug 15 and the connecting-hole 14, the piston then being at or near the left-hand end of the cylinder. Now if fluid is admitted to the left-hand end of the cylinder it will pull upon the connecting-link 13 and swing the ladle in a clockwise direction until the ladle-body strikes the frame 23 on its side. The tilting to normal position will be carried out by admitting fluid to the right-hand end of the cylinder. In both cases the stroke of the piston is less than the length of the cylinder, stopping at an intermediate point in the length of the cylinder when the ladle strikes and is stopped by the frame 23 in its downward movement. In order to lock the ladle in upright position, when arranged for tilting in either direction, we provide spacing-collars 24 and 25 upon the guide-rod 10; and upon a locking-rod 26, mounted in bearings 27 on the frame, we provide two latches or pawls 28. These latches are rigidly secured to the locking-rod, and their bottom portions are shaped as shown in Fig. 2, so that when they are swung forward they will rest in line with the guide 9. The depending bent handles 26 then hold them in this position. In the position shown in Fig. 1, the ladle is locked in vertical position by the guide 9, which is held between the spacer 24 and the latch 28. When arranged for tilting in the opposite direction, the guide 9 will be similarly held between the spacer 25 and the other pawl 28 near the central portion of the rod 26. The ladle is unlocked in either position by turning the rod through either handle 26. Instead of using a motive cylinder we may employ gearing or mechanical connections for moving the cross-head. Thus in Fig. 5 the central portion of the cross-head 8′ is provided with a screw-threaded hole to receive the screw 7′, which corresponds to the piston-rod of the motor. This screw or worm is carried in bearings 31 in the frame, and at its other end is provided with a gear-wheel 32, intermeshing with the pinion 33, driven by an electric or other rotary motor 34, mounted on the frame. The ladle is tilted in this form by rotating the shaft 7 in either direction, and the ladle will be locked in normal position by the screw. The method of changing the connection of the link is the same as in the first form.

The advantages of our invention result from the simplicity of the device and the ease of changing it for tilting in either direction. The stationary portion of the motor is stationary at all times and is not shifted in changing the direction of tilting. Another advantage of our construction is that the pressure is applied to the gear-wheel at a point above the axis of rotation, so that a long lever-arm is obtained, enabling a smaller motor to be used. The apparatus may be applied to existing ladle-cars and is efficient and economical. Where a motor-cylinder is employed, the piston may be stationary and the cylinder movable, and many other changes may be made in the form and arrangement of the motor and connections without departing from our invention.

We claim:—

1. A tipping car having a stationary motor, a cross-head actuated thereby, and a link connected with the cross-head and having two points of connection with the trunnion; substantially as described.

2. A tipping car having a motor with its stationary portion stationary at all times, the movable portion of the motor having a connection arranged to tilt the car, and means for adjusting the connection to different relative positions while the stationary motor portion remains in its fixed position, the point of attachment for the connection being located on a turning element and in a plane at one side of the trunnion center to afford a lever arm; substantially as described.

3. A rolling and tipping car having a motor with its stationary part stationary at all times, the movable portion of the motor having a connection arranged to tilt the car, and means for adjusting the connection to different relative positions, the point of attachment of the motor connection being on a turning element and at a different horizontal level than a horizontal plane through the trunnion center; substantially as described.

4. A tipping car having a movable cross-head, a link pivoted to the cross-head and having a plurality of points of connection to the trunnion, and means for moving the cross-head endwise; substantially as described.

5. A tipping car having a movable cross-head, a link pivoted to the cross-head and having a plurality of points of connection to the trunnion, means for moving the cross-head endwise, and means for locking the car-body in vertical position; substantially as described.

6. A tilting car or ladle having a horizontally-extending pivotal link connected to its trunnion above the axis of rotation, and connections for moving said link in a general horizontal direction; substantially as described.

7. A rolling and tilting car having a trunnioned body, a reciprocating element and a pivoted link connection from said element leading to the trunnions above the axis of rotation, and a motor having its stationary parts stationary at all times, the connections being arranged to tilt the car in either direction; substantially as described.

8. A tilting car having a trunnioned body and an actuating connection comprising a reciprocating element and a pivotal link extending therefrom and leading to the trunnion above the axis of rotation and arranged to be shifted to change its connection to the trunnion; substantially as described.

9. A rolling and tilting ladle supported on trunnions, a stationary motor, a link connected to one of the ladle-trunnions and having two points for connection with the trunnion, and a connection between the motor and the link arranged to either push or pull the link to tilt the ladle in opposite directions, without moving the stationary portion of the motor; substantially as described.

10. A ladle-car having a trunnioned ladle, a motive cylinder having one part stationary and a movable bar connected to a cross-head and a link extending from the cross-head and having shiftable connection with the trunnions, the stationary part of the motor remaining in its fixed position during shifting of the link connection; substantially as described.

11. A ladle-car having a movable cross-head with a shiftable link connected to the trunnions, and locking means arranged to engage the cross-head to lock the ladle upright when arranged for tilting in either direction; substantially as described.

12. A ladle-car having a trunnioned ladle, a cross-head having a link with a shifting connection to the trunnions, and a tilting shaft having latches arranged to lock the cross-head with the ladle upright, when arranged for tilting in either direction; substantially as described.

13. A ladle-car having a motive cylinder with one element stationary, a cross-head connected to the movable element, and a link pivoted to the cross-head and having two points of connection either of which may be removably connected to the trunnion; substantially as described.

14. A car having a tilting ladle mounted on trunnions, a motive cylinder having one element stationary at all times, a cross-head connected to its movable element, and a link connected to the cross-head and pivoted to the trunnion above its center of rotation, said link having two interchangeable points of connection; substantially as described.

15. A rolling and tipping car having a motor with its stationary part stationary at all times, the movable portion of the motor having a connection arranged to tilt the car, and means for adjusting the connection to different relative positions, the point of connection being at a level above a horizontal plane through the trunnion center; substantially as described.

In testimony whereof, we have hereunto set our hands, this 11th day of January, 1909.

ERWIN C. SHERMAN.
WILLIAM W. McKELVEY.

Witnesses:
THOS. H. JENKINS,
W. G. WILSON.